(No Model.)
H. BURT.
CAKE GRIDDLE.
No. 414,285. Patented Nov. 5, 1889.
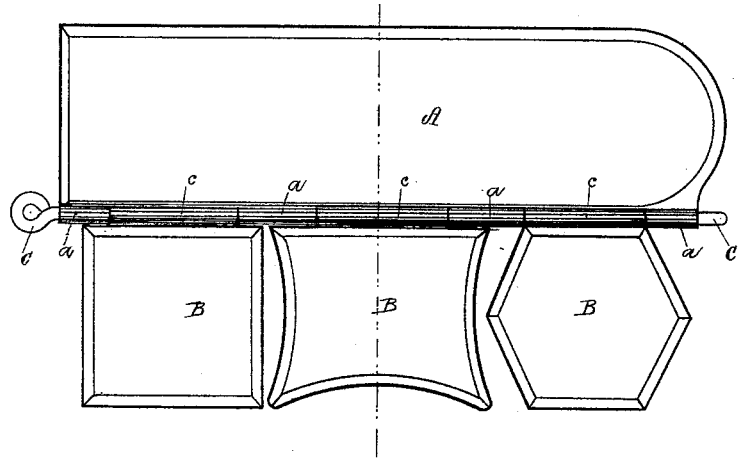
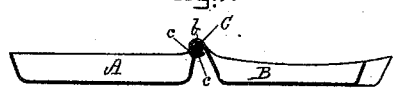
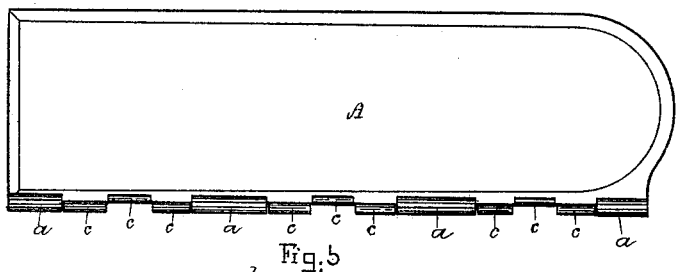
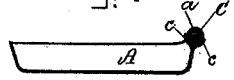
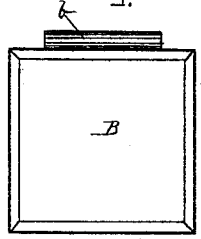
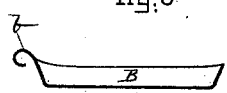
Witnesses.
R. B. Torrey
Francis McMahon
Inventor
Henry Burt.
by Singleton & Piper, att'ys

UNITED STATES PATENT OFFICE.

HENRY BURT, OF HARTFORD, CONNECTICUT.

CAKE-GRIDDLE.

SPECIFICATION forming part of Letters Patent No. 414,285, dated November 5, 1889.

Application filed July 9, 1887. Serial No. 243,809. (No model.)

*To all whom it may concern:*

Be it known that I, HENRY BURT, of the city and county of Hartford, in the State of Connecticut, have invented a new and useful Improvement in Cake-Griddles; and I do hereby declare the same to be described in the following specification and represented in the accompanying drawings, of which—

Figure 1 is a top view, and Fig. 2 a transverse and median section, of a griddle embodying my invention, the nature of which is defined in the claims hereinafter presented. Fig. 3 is a top view, and Fig. 4 a transverse section, of the main baking-pan of such griddle, while Fig. 5 is a top view, and Fig. 6 a transverse section, of one of the auxiliary pans; and Fig. 7 is a side view of the connecting rod or bolt of such pans.

A cake-griddle composed of one oblong pan and two or more auxiliary and smaller pans hinged thereto is not a new invention. In this case the pans were of cast metal, and each auxiliary pan was inseparably hinged to the main pan, all the pivots of the hinge-joints being separate from each other. For such a griddle reference may be had to the United States Patent No. 237,051.

My improved cake-griddle, having one oblong pan and a series of auxiliary ones hinged thereto, is in its construction intended to prevent the hinge-joints not only from becoming rickety, but of being fouled with dough or burnt grease and not easily cleansed, as with my improvement all the auxiliary pans are readily separable at once from the main pan, whereby the joints of both main and auxiliary pans become exposed in a manner to admit of deposits in them being readily removed. Furthermore, each pan is struck up from sheet metal, and they are provided with lips extending from them and bent circularly transversely of them, in order for such lips to constitute parts of hinges for connecting the pans by a single bolt or rod extending through the several lips and readily removable therefrom to admit of the main and auxiliary pan being separated for being cleansed as occasion may require.

In the drawings, A denotes the main and B B B the series of auxiliary pans, while C is their connecting hinge, bolt, or rod. The main pan has four lips $a$ extending from it at one edge, they being at suitable distances apart and each bent transversely of it in the arc of a circle of two hundred and forty degrees, or thereabout. There is also to each of the auxiliary pans a lip $b$, extending from one edge of it and bent in like manner, the lips of the auxiliary pans having lengths corresponding to the spaces between the lips of the main pan. On the lips of the auxiliary pans being inserted in such spaces and the rod being passed through all the said hinge-lips the main and auxiliary pans will be connected. As each lip is bent in an arc of about two-thirds of a circle, it will be seen that there is a lateral slot or opening into the covered space within the lip, such opening readily admitting of a brush or cloth being introduced into such space for cleansing it. In each space between the hinge-lips of the main pan the metal of the edge of the pan is bent outwardly next the lips and inwardly at the middle of the space, so as to form bearings $c\ c\ c$ for the hinge-lips of the auxiliary pan, in order to bring it into range with the next adjacent lips of the main pan.

As this griddle is to be used in practice for baking or cooking griddle-cakes in a manner like that described in the aforesaid patent, it will not be necessary for me to describe such manner. By pulling the rod out of the hinge portions or lips of the pans such pans become separable from each other, and when the rod is in place in such hinge portions all the pans will be connected, so as to enable each auxiliary one to be turned over and off the main pan as occasion may require.

I do not herein claim a cake-griddle constructed as described and represented in the aforesaid patent.

I claim—

1. A cake-griddle provided with a hinge, each lip of which is bent into an arc of a circle, there being a lateral slot or opening into the covered space within the lip, as set forth.

2. The combination of the pan A, having the lips $a$ and between them the bearings $c$, the pans B, having the lips $b$ of a length to correspond with the spaces between the lips $a$, the said lips $a$ and $b$ being bent into the arcs of circles, there being a lateral slot or opening into the spaces within the lips, as set forth.

HENRY BURT.

Witnesses:
 J. C. WASSERBACH,
 F. E. LUDLOW.